Sept. 7, 1965 W. E. BATES 3,205,288
METHOD OF MANUFACTURE OF HOLLOW REINFORCED PLASTIC ARTICLES
Filed July 24, 1961 3 Sheets-Sheet 1
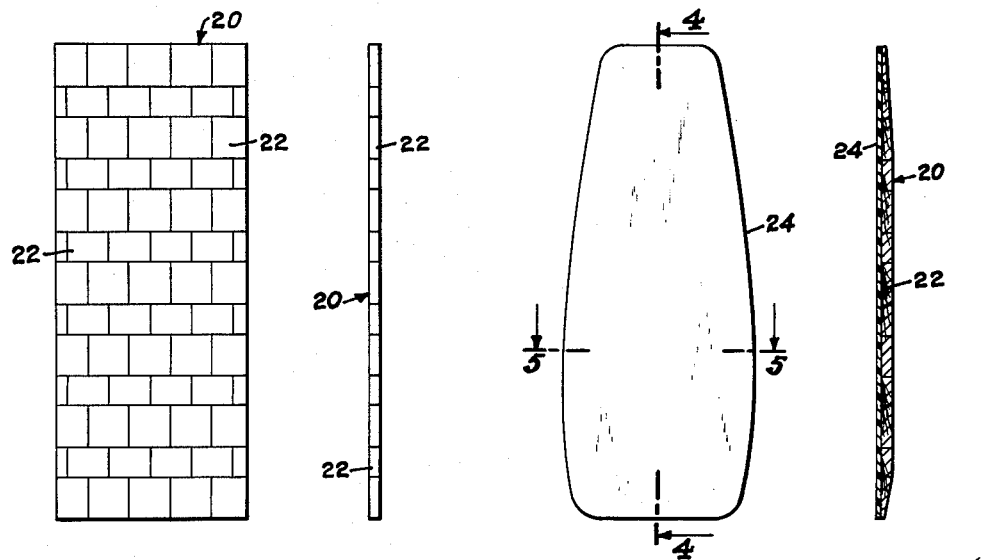
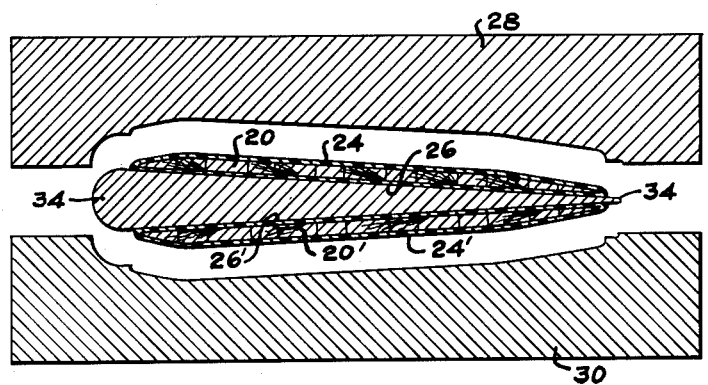
INVENTOR.
WILLIAM E. BATES
BY
HIS ATTORNEY Sept. 7, 1965      W. E. BATES      3,205,288

METHOD OF MANUFACTURE OF HOLLOW REINFORCED PLASTIC ARTICLES

Filed July 24, 1961      3 Sheets-Sheet 2

INVENTOR.
WILLIAM E. BATES
BY William V. Ebs
HIS ATTORNEY

Sept. 7, 1965            W. E. BATES            3,205,288
METHOD OF MANUFACTURE OF HOLLOW REINFORCED PLASTIC ARTICLES
Filed July 24, 1961            3 Sheets-Sheet 3
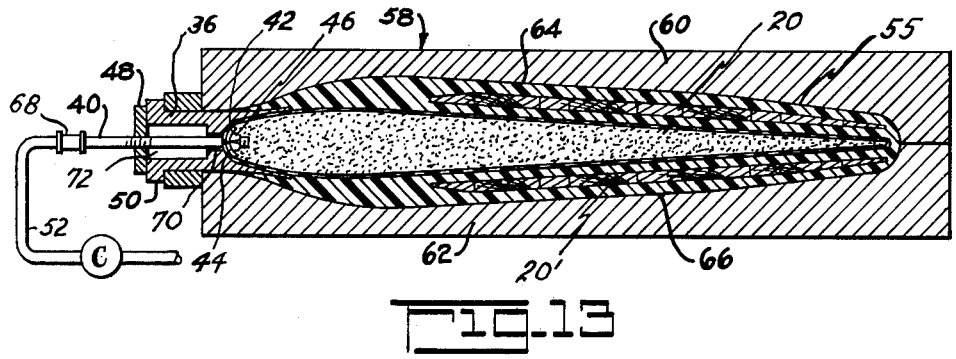
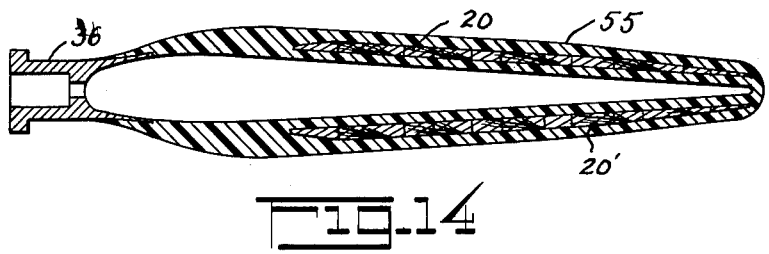
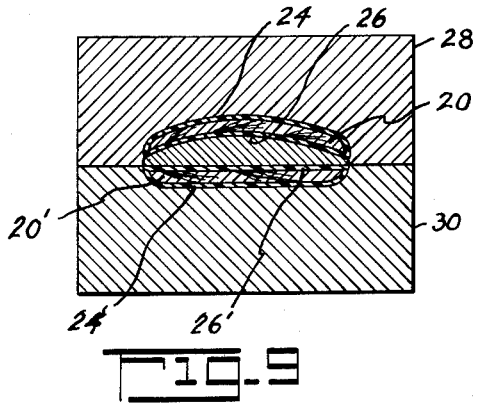
*INVENTOR.*
WILLIAM E. BATES
BY
*William V. Ebs*
HIS ATTORNEY United States Patent Office 3,205,288
Patented Sept. 7, 1965

3,205,288
METHOD OF MANUFACTURE OF HOLLOW
REINFORCED PLASTIC ARTICLES
William E. Bates, Towaco, N.J., assignor to Curtiss-Wright
Corporation, a corporation of Delaware
Filed July 24, 1961, Ser. No. 126,117
2 Claims. (Cl. 264—255)

My invention relates to a method for making hollow reinforced plastic articles.

Hollow reinforced plastic articles may be produced by various techniques known in the art. Generally, such articles are characterized by great strength and light weight. If the skin is unduly flexible for a particular purpose stiffening means are employed to render the skin sufficiently rigid for the intended use. Stiffening ribs or other structures are sometimes attached to the inside or unexposed surface to render the skin more rigid. In the case of closed shapes, however, stiffening structures cannot be assembled within the article after it has been formed, and in substantially closed shapes it may also be impossible or at least difficult to do so. Even if an article can be stiffened by assembling structural elements within it or by filling the object with a liquid or foam which thereafter solidifies into a rigid reinforcing structure, nevertheless, such techniques may result in an undue increase in the weight or cost of the article and may also compromise structural integrity.

The prime object of the invention is to provide an improved lightweight hollow reinforced plastic article and an improved method of making such article with a skin that embodies a stiffening layer of material effective to render it unnecessary to employ other stiffening means within the interior of the object.

In carrying out the invention a plurality of multilayered sheets are formed, each with outer layers of resin impregnated reinforcing material which overlie a less dense stiffening layer or core. Balsa wood is a preferable material for the core, however, other suitable lightweight materials also may be used. A honeycombed structure formed of a light-weight metal or reinforced plastic might be used to advantage. An expandable and collapsible mandrel of the type disclosed, for example, in the co-pending patent application of Kenneth G. Smack, Serial No. 771,316, filed November 3, 1958, and now U.S. Patent No. 3,008,859, having the general configuration of the article to be made, is provided. Resin impregnated reinforcing material is laid-up on the mandrel. The multilayered sheets are formed and cured in order to set the resin in a mold having the configuration of the covered mandrel. Thereafter, the sheets are placed over the impregnated reinforcing material already in place on the mandrel, and the mandrel is expanded in a mold having the desired outside contour of the article. The molded form is cured, and at the end of the curing period the mandrel is collapsed and, if desired, removed from the formed article. The invention is particularly applicable to aircraft propeller blades and the description which follows describes in detail the manner of producing a hollow propeller blade in conformance with the invention. It is to be understood, however, that the invention is not limited to propeller blades, but is applicable to other hollow forms as well.

Referring to the drawings:

FIGS. 1 and 2 are plan and edge views respectively showing a sheet of end grain balsa wood;

FIGS. 3 and 4 are plan and edge views respectively showing the sheet of FIGS. 1 and 2 as it appears after machining and with a reinforced plastic layer on one side;

FIG. 5 is a sectional view taken on the plane of the line 5—5 of FIG. 3;

FIG. 6 is a view similar to FIG. 5 showing plastic layers on both sides of the sheet of balsa wood;

FIG. 7 is a longitudinal vertical sectional view showing multilayered sheets, such as illustrated in FIG. 6, positioned on a mandrel in an open mold;

FIG. 9 is a transverse vertical sectional view showing the multilayered sheets in the closed mold;

FIG. 13 is a longitudinal vertical sectional view showing the structure of FIG. 11 in a mold wherein the blade is finally molded to form;

FIG. 14 is a longitudinal vertical sectional view showing the molded form with the mandrel removed.

Figure 8:
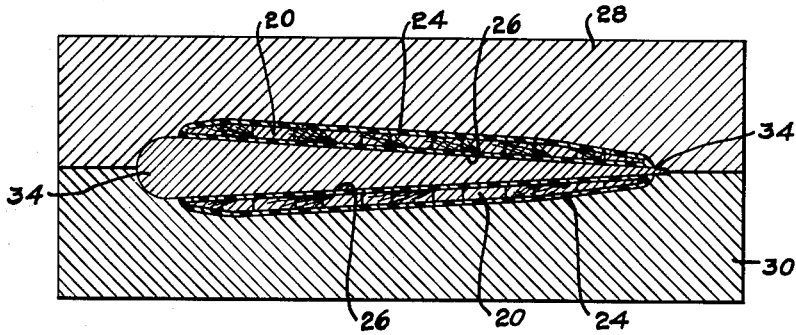
FIG. 8 is a view similar to FIG. 7 showing the mold in a closed condition.

Referring to the drawings:

Reference character 20 designates a sheet of end grain balsa wood, that is, a sheet in which the grain of the wood runs normal to the thickness of the material. As shown, the sheet is made up of a multitude of flat pieces 22 glued together at the edges (FIGS. 1 and 2). The sheet 20 is machined to approximate the developed planform of at least part of one side of the propeller blade. A layer 24 of resin impregnated reinforcing material is laid-up on one surface of the sheet and cured against a flat platten, after which the balsa sheet is machined to taper the thickness toward the edges as, for example, in the manner shown (FIGS. 4 and 5), to satisfy structural and geometric requirements of the blade. A thermosetting resin which cures to a solid is used to impregnate the reinforcing material. It is convenient to use fibrous glass cloth for the reinforcing material. The machined composite sheet, consisting of the balsa wood layer 20 and reinforced plastic layer 24, is then heated in a furnace to remove moisture and other volatiles from the balsa sheet 20, at a temperature which is preferably in excess of the highest temperature employed in subsequent plastic curing operations mentioned hereinafter. After removal of the composite sheet from the furnace and before the balsa wood has cooled appreciably, resin impregnated reinforcing material is laid-up on the uncovered side of the sheet to form a sealing layer 26 (FIG. 6). The result is a multilayered sheet consisting of the inner balsa layer 20 and outer layers 24 and 26. A second multilayered sheet for the other side of the blade is prepared in a similar fashion consisting of an inner balsa wood layer 20', an initially applied layer 24' on one side of the balsa wood layer and another layer 26' on the other side of the balsa wood layer 20', and the two sheets are placed between the parts 28 and 30 of a mold 32 on opposite sides of a mandrel 34 (FIG. 7). The mold is closed to form the sheets under heat and pressure between the mandrel and mold walls to substantially a configuration desired in the finished propeller blade (FIGS. 8 and 9). The sheets are cured in the closed mold at a selected temperature depending upon the particular resin used. After curing, the sheets are removed from the mold. The resin sets during the curing operation and the sheets, therefore, retain the form to which they are shaped when removed from the mold.

Figure 10:
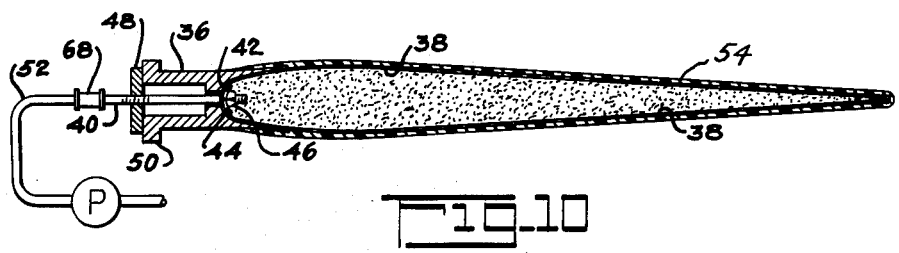
FIG. 10 is a longitudinal vertical sectional view showing a blade shank and mandrel with an overlying layer of uncured reinforced plastic thereon.
Figure 11:
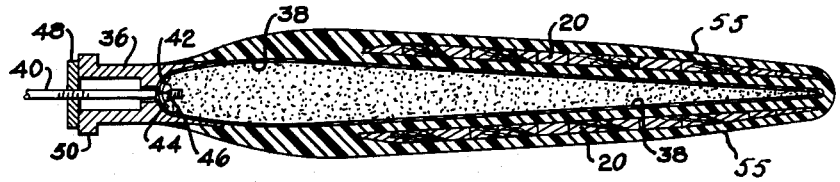
FIG. 11 is a longitudinal vertical sectional view showing the shank and mandrel with various layers thereon which are applied prior to insertion of the structure in a mold.
Figure 12:
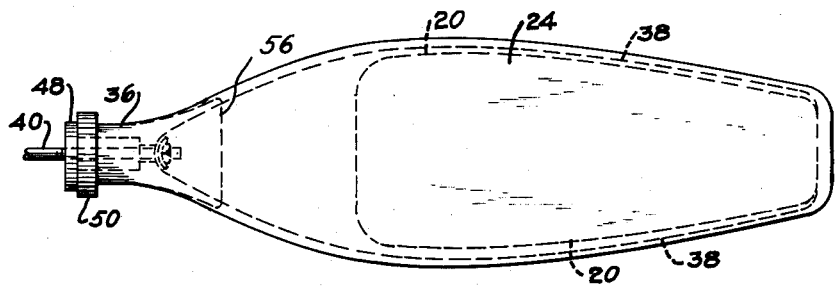
FIG. 12 is a plan view of the structure of FIG. 11.

A mandrel, such as disclosed in the co-pending application of Kenneth G. Smack, Serial No. 771,316, filed November 3, 1958, and now U.S. Patent No. 3,008,859, is provided, such mandrel comprising in assembled relationship, a shank 36 and an inflatable bag 38 containing granules 39, the bag having been rendered rigid by evacuation of air therefrom and having the general configuration of the airfoil portion of the propeller blade (FIG. 10). As shown, the bag is assembled to the shank by means including a length of pipe 40, split rubber washers 42 and 44 and the nut 46, threaded on the pipe. Plate 48, threaded on the pipe and bearing against face 50 of the shank, exerts a pulling force on the pipe length 40 causing nut 46 to press the converging end of the bag through the washers 42 and 44 against the shank. The pipe length is connected to pump (P) in the line 52, which pump maintains a vacuum on the bag. Resin impregnated reinforcing material, such as used over the balsa wood sheet, is laid-up over the mandrel and a portion of the shank to form layer 54 as shown (FIG. 10). The molded multilayered sheets are disposed on the mandrel over layers 54 and additional resin impregnated reinforcing material is applied over the multilayered sheets and layer 54 (FIGS. 11 and 12), to complete the build-up of laid-up material, generally designated by reference character 55.

After the resin impregnated material has been laid-up over the multi-layered sheets, the entire structure is placed in a mold 58 having separable parts 60 and 62 with walls 64 and 66, which accurately define a configuration for the outside surface of the propeller blade (FIG. 13). The pipe line 52 is disconnected from pump (P) of FIG. 10 and connected to a compressor (C) which is used to pressurize the bag so as to expand the bag wall outwardly and force the laid-up material against the mold walls. Because of the pressure to which the resin impregnated material on both sides of the multilayered sheets is subject, compactness of the resin and resin reinforcing material is obtained. The uncured resin impregnated material is cured in the mold under pressure for a suitable period, at a selected temperature.

After curing, pressure on the bag is relieved. The pipe length 40 is disconnected from pipe line 52 at coupling 68 and from the nut 46, whereupon pipe length 40 is withdrawn from the shank 36. The nut 46 and split washers 42 and 44 are removed from the bag through opening 70 in the shank, which opening is of sufficient size to permit withdrawal of these parts. After removal of all parts from the bag, the bag is removed from the molded form, through shank openings 70 and 72. Pull strings attached to the bag, but not shown in the drawings, may be used to pull the bag inside out and through the openings 70 and 72. In the alternative, the bag may be left in place in adherence to the plastic reinforced material on the inside surface of the multilayered sheets. In such event, pull strings would not be required. When removal of the bag is contemplated, the bag is made from a non-adhering material such as Teflon or coated with a suitable mold release compound at the outset of the process. The molded form is taken from the mold as a hollow, structurally reinforced plastic propeller blade (FIG. 14).

Although it appears from the drawings that a substantial thickness of reinforced plastic material 55 overlies the opposite sides of each of the balsa sheets in the blade, actually the overlying reinforced plastic material is relatively thin in comparison to the thickness of the balsa sheets. Thicknesses of reinforcing plastic material have been exaggerated in the illustrations to render the drawings readable, and to show the manner in which the reinforced plastic material of the blade is built-up. The relatively thicker layer of balsa wood in the finished blade imparts great rigidity to the blade without adding unduly to the overall weight. It has been pointed out that balsa wood is particularly suitable for use in imparting the desired degree of rigidity, but that other materials may also be used. With the stiffening layer less dense than the reinforced plastic portion of the finished blade or other structure, very desirable strength to weight ratios may be realized. A lightweight honeycomb layer of reinforced plastic or metal might, for example, be used advantageously to impart the degree of rigidity desired in a structure.

Instead of building up the layers of reinforced plastic material by laying-up resin impregnated reinforcing material as described, unimpregnated reinforcing material may be laid-up and thereafter impregnated with resin in a mold into which resin is introduced while a vacuum is drawn on the mold. The resin may simultaneously be forced into the mold under pressure if desired. The use of such technique is within the scope of the invention. It will be clear to those skilled in the art that other changes and modifications may also be made in the invention shown and described without departing from the spirit and scope of the invention as set out in the appended claims.

I claim:
1. A method of making a hollow propeller blade comprising the steps of providing a pair of composite sheets each consisting of a layer formed of resin impregnated reinforcing glass cloth on one side of a thicker layer of less dense material, heating said composite sheets, applying resin impregnated glass cloth to the other side of the thicker layer of each of the composite sheets before such sheets have cooled substantially, preforming the resulting multilayered sheets on opposite sides of an expandable and contractable mandrel in a mold to substantially the configuration of the propeller blade, curing the preformed sheets under heat and pressure in the mold, removing the preformed sheets from the mandrel, applying resin impregnated reinforcing glass cloth to the opposite sides and over edges of the mandrel, replacing the preformed sheets on the mandrel, applying additional resin impregnated reinforcing glass cloth to the opposite sides of the mandrel and over the preformed sheets as well as over edges of the mandrel, expanding the mandrel in a mold having the desired contour for the propeller blade, curing the molded form therein under heat and pressure, and collapsing and removing the mandrel from the formed propeller blade.

2. The method of claim 1 wherein said preformed sheets and molded form are cured at temperatures less than the temperature to which the said composite sheets are heated.

References Cited by the Examiner
UNITED STATES PATENTS 1,504,547 8/24 Egerton.
2,202,042 5/40 Blount _____ 264—314
2,737,227 3/56 Brummel _____ 156—213 XR ROBERT F. WHITE, *Primary Examiner.*

CARL F. KRAFFT, *Examiner.*